UNITED STATES PATENT OFFICE.

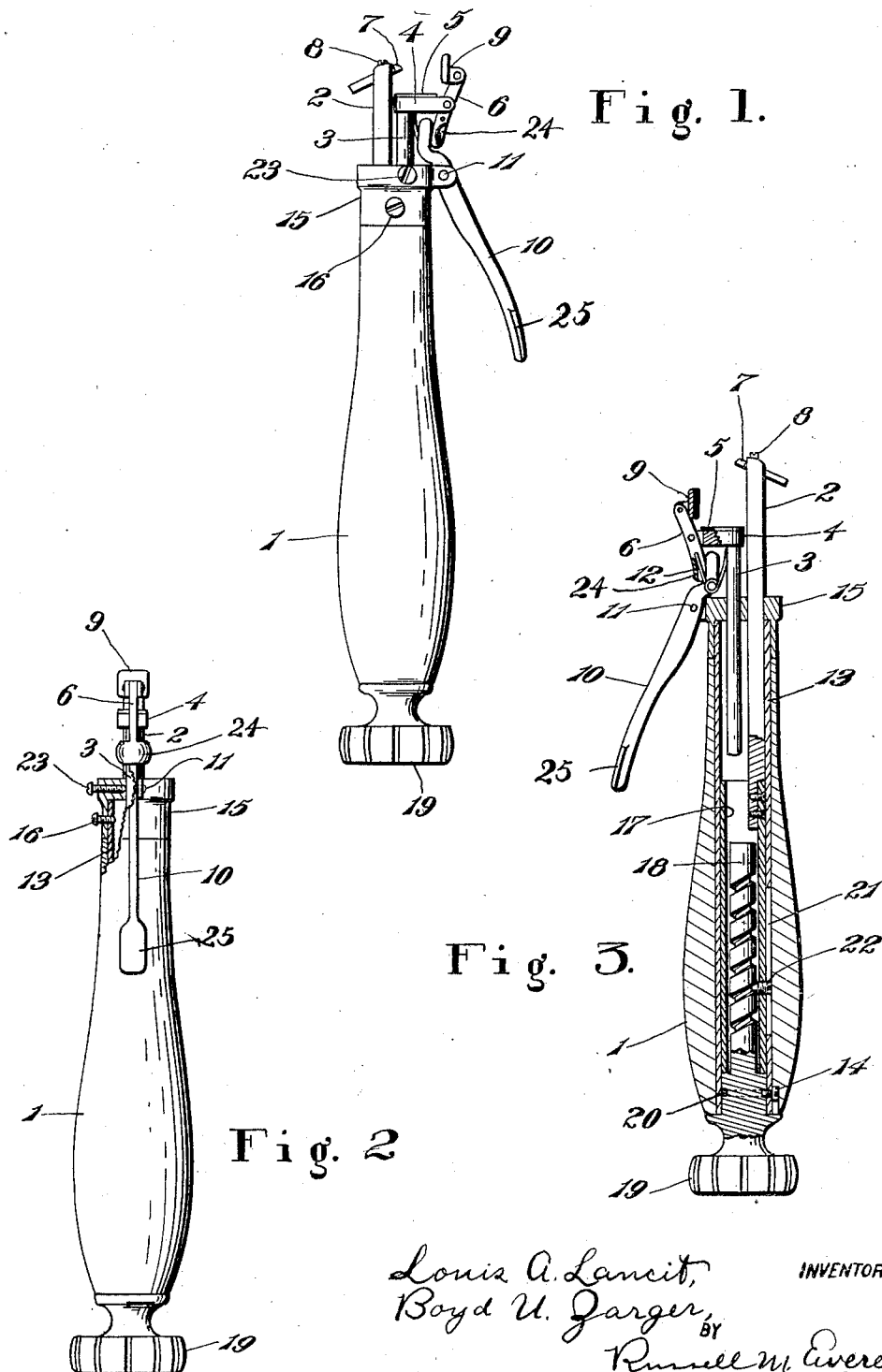

LOUIS A. LANCIT AND BOYD U. ZARGER, OF NEWARK, NEW JERSEY.

DENTAL INSTRUMENT.

1,349,464.  Specification of Letters Patent.  Patented Aug. 10, 1920.

Application filed June 14, 1919. Serial No. 304,122.

*To all whom it may concern:*

Be it known that we, LOUIS A. LANCIT and BOYD U. ZARGER, both citizens of the United States, and residents of Newark, in the county of Essex and State of New Jersey, have invented new and useful Improvements in Dental Instruments, of which the following is a specification.

This invention relates more particularly to dental instruments the purpose of which is to split crowns attached to teeth so that they may be removed therefrom.

The objects of the invention are to provide such an instrument by which the crown can be readily gripped and supported during the splitting operation; to avoid strain upon the patient's jaw and thus eliminate pain and discomfort; to enable the crown to be removed without such damage as will prevent it from being used over again; to provide a construction wherein the splitting is readily and effectively performed; to control the reciprocation of the splitting means by means which does not itself reciprocate; to provide for adjustment to varying conditions of operation; to secure simplicity of construction and operation, and to obtain other advantages and results as may be brought out in the following description.

Referring to the accompanying drawing, in which like numerals of reference indicate the same parts throughout the several views, Figure 1 is a side elevation of an instrument embodying the invention, with the cutter retracted or near the inner end of its stroke;

Fig. 2 is an edge view looking toward the left of Fig. 1, and showing certain parts in section, and Fig. 3 is a central section looking toward the instrument from the side opposite that shown in Fig. 1 and with the cutter partly extended.

In the specific embodiment of the invention illustrated in said drawing, the reference numeral 1 indicates a handle, preferably elongated, and longitudinally from one end of which projects a slide bar 2 and a post 3. The post 3 has a tooth rest 4 at its outer end, preferably faced on its tooth-engaging portion with rubber 5 or other suitable material, and also has a tooth clamp 6 pivoted thereto, said tooth clamp being upon the side away from the slide bar 2, so a tooth may be gripped securely between said clamp and bar, the end of the tooth at the time engaging the rest 4. Obviously, therefore, engagement of the tooth at its end and two exposed sides is thus obtained, and while the tooth, with its inclosing crown, is thus gripped, a cutter 7 is passed along the crown for splitting it.

The cutter disclosed herein has a laterally sharpened end portion and extends transversely through the slide bar 2 near the outer end thereof, said cutter preferably being at an angle to the bar, that is, inclined outwardly toward its point. Holding of the cutter 7 is effected by a set screw 8 in the bar 2, this set screw also permitting the cutter to be adjusted for varying depths of cut. It will be observed that the cutting is obtained with the handle 1 remaining stationary, the bar and cutter being moved, the bar sliding against the tooth but acting as a clamping jaw at the same time.

The pivoted clamp 6 above referred to preferably is a lever pivoted intermediate its ends and having a pivoted jaw 9 at its outer end facing toward the bar 2 and faced with rubber or other suitable material so as to securely engage the tooth or its crown without danger of slipping or of damaging the same. The other end of the clamp lever 6, or end toward the handle 1, is adapted to be engaged by a key lever 10 pivoted as at 11 to the handle and swinging in the same plane as the jaw lever. Said levers overlap sufficiently to permit of adjustment of the tooth-rest 4, to which the jaw lever is pivoted, without rendering the levers correlatively inoperative. The lower end of the key lever 10 is shaped to be engaged by the dentist's thumb or finger, and held during the cutting operation, such holding causing the jaw 9 to grip the tooth. To facilitate applying the instrument to a tooth the pivoted clamp is preferably held normally swung back into its idle position, a spring 12 from the lever to the post 3 resiliently actuating the jaw lever to that position.

The handle 1 is preferably centrally hollow, and contains a sleeve 13 fitted therein extending substantially the length of the handle. As shown, this sleeve is prevented from rotation by a screw 14 the head of which is upon the outside of the sleeve near its bottom and fits within a short slot in the handle. The other end of the sleeve is shown attached to the flange of a cap 15 which depends over the sleeve, a screw 16 passing through both the flange and sleeve for this purpose, but obviously this might be otherwise, for instance, integral, if so desired. In any event, the sleeve is held both against longitudinal and rotary motion within the handle.

Carried within the sleeve 13 is a tube 17 and within the tube is a worm 18. The worm has a knob or finger-piece 19 integral or otherwise at the lower end of the handle, a portion of the knob extending within the sleeve and held by the screw 14 above-mentioned as adjacent the lower end of the sleeve, said screw having its end projecting into a circumferential groove 20 in the knob. The sleeve is provided with an appropriate longitudinal slot 21 in which the head of a screw 22 rides, this screw being threaded through the wall of the tube 17 so as to be fast with respect thereto, and having its inner end reduced and projecting into the spiral groove of the worm. By this means, therefore, the tube may be reciprocated within the sleeve by virtue of the interengagement of the screw 22 with the worm, but is prevented from rotating by virtue of the engagement of said screw in the slot of the stationary sleeve. Reciprocation of the sleeve is imparted to the slide bar 2, these parts being shown as separable for convenience of manufacture, but they might be integral if found more desirable.

It may here be added that the adjustment of the post 3 carrying the rest 4 is obtained by holding said post in position by a set screw 23 transversely inserted in the cap 15, or any other suitable means. Also the end of the clamp lever opposite the jaw 9, is preferably provided at its outer edge with a transverse outwardly rounded shield 24, to prevent discomfort if it should engage the cheek of a patient. The operating end of the key lever 10 is similarly provided with a shield 25 so that it will not cause discomfort to the thumb or finger of the dentist while pressing upon it to grip a crown during operation of the instrument.

In operation, the instrument is positioned by the dentist so the rest 4 engages the end of the crown to be split or cut, and the slide bar 2 positioned on one side of the tooth and the clamping jaw 9 on the other, application in this manner being facilitated by the spring 12 which holds the jaw 9 normally away from the rod. It will be noted that the cutter 7, in applying the instrument, is positioned over the edge of the crown by extending the slide bar somewhat as shown in Fig. 3. After the instrument has been thus applied, the dentist presses upon the key-lever 10 by which the jaw 9 is swung against the tooth, thus gripping the crown between said jaw and slide bar. While the crown is thus gripped, the knob or finger-piece 19 is turned, which, by coöperation between the worm 18 and tube 17, reciprocates said tube and its attached slide bar 2, drawing the cutter down along the crown, cutting or slitting the same so that it may be removed from the patient's tooth. Since the reciprocation is produced very gradually and uniformly by turning the knob 19, there is no uneven strain or pull upon the tooth as there might be if the cutter was reciprocated directly by longitudinal movement of a member by hand without the intervention of the screw.

It will be noted that during the splitting the crown is firmly supported upon the rest 4 and clamped at its opposite sides against any possible movement, so that there is no strain upon the tooth or the patient's jaw, and all pain and discomfort are avoided. By reason of such a firm seating of the crown, the cutter 7 readily makes a longitudinal slit in the side of the crown, which is of comparatively light and soft material, so that the crown can be easily and readily removed. The crown having been firmly supported by cushioned surfaces during the cutting, is not injured otherwise than by the longitudinal slit, and when said slit can be readily closed by solder and the crown replaced for further use tending to great economy and convenience. By my invention, therefore, it is a comparatively simple matter to remove a crown when for any reason it becomes necessary, perform whatever is to be done and then replace the crown, and all this can be done without pain or discomfort to the patient and without great expense or trouble.

As indicated, the handle 1 and sleeve 13 might be integral or all in one piece and indeed this single piece could include the cap 15 if desired, since all these parts are shown by us in fixed relation. Various other detail modifications and changes might also be made in constructing our improved instrument without departing from the spirit and scope of the invention, and we do not wish to be understood as restricting ourselves except as required by the following claims when construed in the light of the prior art.

Having thus described our invention, what we claim is.

1. A dental instrument including a rest to engage the outer end of a crown on a tooth, clamping members arranged on opposite sides of said rest to engage the sides of the crown for securely gripping the crown between them, and a cutter mounted on one of said clamping members for slitting the crown while so gripped.

2. A dental instrument including a rest to engage the outer end of a crown on a tooth, a gripping member mounted upon one side of said rest to engage one side of the crown, a cutter arranged at the opposite side of said rest for slitting the crown, and means for reciprocating said cutter to slit the crown.

3. A dental instrument including a handle, a cutter mounted on said handle to engage one side of a crown on a tooth, a gripping member mounted on the said handle to engage the opposite side of the crown to clamp the crown between said gripping member and cutter and hold the cutter in engagement with said crown, and means for operating said cutter to slit the crown while so gripped.

4. In a dental instrument, the combination of a body portion providing a rest or seat for the end of a crown on a tooth, a slidable bar at one side of said rest or seat, clamping means at the other side of said rest or seat, a cutter on said bar, means at the other end of the body portion for sliding said bar, and means intermediate the ends of the body portion for operating said clamping means.

5. A dental instrument having a handle, a cutter slide projecting from one end of the handle, a worm inclosed in the handle, said worm coacting with said slide to project and retract the same, crown engaging means adjacent the projecting end of the slide, and means for operating said worm.

6. A dental instrument having a handle, a cutter slide projecting from one end of the handle, a worm inclosed in the handle, said worm coacting with said slide to project and retract the same, a stop for limiting reciprocation of the slide, crown engaging means adjacent the projecting end of the slide, and means for operating said worm.

7. In a dental instrument having a handle, a crown rest, means for adjusting said rest with respect to said handle, a crown clamping member pivoted to the said rest, and a lever pivoted on the handle for operating said clamping member, said lever and clamping member having engaging parts permitting relative shifting incident to adjustment of the crown rest.

8. In a device of the character described, an elongated handle, a sleeve fixed within said handle, a tube slidable within said sleeve, means for preventing rotation of said tube and permitting sliding thereof, means for reciprocating said tube, and a crown cutter reciprocated by said tube.

LOUIS A. LANCIT.
BOYD U. ZARGER.